(12) United States Patent
Dey et al.

(10) Patent No.: US 11,948,378 B2
(45) Date of Patent: Apr. 2, 2024

(54) MACHINE LEARNING TECHNIQUES FOR DETERMINING PREDICTED SIMILARITY SCORES FOR INPUT SEQUENCES

(71) Applicant: UnitedHealth Group Incorporated, Minnetonka, MN (US)

(72) Inventors: Subhodeep Dey, Chandigarh (IN); Brad Booher, Baldwin, WI (US); Edward Sverdlin, Edina, MN (US); Reshma S. Ombase, Olathe, KS (US); Raghvendra Kumar Yadav, Uttar Pradesh (IN)

(73) Assignee: UnitedHealth Group Incorporated, Minnetonka, MN (US)

( * ) Notice: Subject to any disclaimer, the term of this patent is extended or adjusted under 35 U.S.C. 154(b) by 96 days.

(21) Appl. No.: 17/560,491

(22) Filed: Dec. 23, 2021

(65) Prior Publication Data
US 2023/0206666 A1    Jun. 29, 2023

(51) Int. Cl.
*G06V 30/00* (2022.01)
*G06V 10/82* (2022.01)
*G06V 30/19* (2022.01)

(52) U.S. Cl.
CPC ........ *G06V 30/19093* (2022.01); *G06V 10/82* (2022.01); *G06V 30/1912* (2022.01)

(58) Field of Classification Search
CPC .............. G06V 10/82; G06V 20/698; G06V 30/19093; G06V 30/147; G06V 30/242; G06V 30/19007; G06N 3/047; G06N 7/01; G06F 18/2413; G06F 40/30; G06F 18/22; G06F 18/28; G06F 40/20; G06F 16/3344; G06F 40/44; G10L 15/1815; G10L 15/183
See application file for complete search history.

(56) References Cited

U.S. PATENT DOCUMENTS

| | | |
|---|---|---|
| 10,713,577 B1 | 7/2020 | Faruquie et al. |
| 2017/0091320 A1 | 3/2017 | Psota et al. |
| 2018/0373744 A1* | 12/2018 | McCord ................. G06N 20/00 |
| 2020/0242623 A1* | 7/2020 | Savir ...................... G06V 10/82 |
| 2020/0272791 A1 | 8/2020 | Jonnalagadda et al. |
| 2020/0356846 A1 | 11/2020 | Saripalli et al. |

(Continued)

OTHER PUBLICATIONS

Coenen et al, Visualizing and Measuring the Geometry of BERT, arXiv:1906.02715v2 Oct. 28 (Year: 2019).*

(Continued)

*Primary Examiner* — Ping Y Hsieh
*Assistant Examiner* — Xiao Liu
(74) *Attorney, Agent, or Firm* — Alston & Bird LLP

(57) ABSTRACT

Systems and methods for dynamically generating a predicted similarity score for a pair of input sequences. A predicted similarity score for a pair of input sequences is determined based at least in part on at least one of a token-level similarity probability score for the pair of input sequences, a target region match indication for the pair of input sequences, a fuzzy match score for the pair of input sequences, a character-level match score for the pair of input sequences, one or more similarity ratio occurrence indicators for the pair of input sequences, and a harmonic mean score of the fuzzy match score for the pair of input sequences and the token-level similarity probability score for the pair of input sequences.

16 Claims, 7 Drawing Sheets

(56) References Cited

U.S. PATENT DOCUMENTS

| | | | |
|---|---|---|---|
| 2021/0117773 A1 | 4/2021 | Sollami et al. | |
| 2021/0287069 A1* | 9/2021 | Mumcuyan | G06N 3/045 |
| 2021/0374347 A1* | 12/2021 | Yang | G06N 3/045 |
| 2021/0397610 A1* | 12/2021 | Singh | G06N 7/01 |
| 2022/0198581 A1* | 6/2022 | Rusu | G06Q 40/12 |
| 2022/0292263 A1* | 9/2022 | Wang | G06N 3/0442 |
| 2022/0414694 A1* | 12/2022 | Sokolovsky | G06N 3/044 |

OTHER PUBLICATIONS

Ebraheem, Muhammad et al. "DeepER—Deep Entity Resolution," arXiv preprint arXiv: 1710.00597v1 [cs.DB], Oct. 2, 2017, (12 pages).

Krishnan, Sanjay et al. "BoostClean: Automated Error Detection and Repair For Machine Learning," arXiv preprint arXiv: 1711.01299v1 [cs.DB], Nov. 3, 2017, (15 pages).

Krivosheev, Evgeny et al. "Siamese Graph Neural Networks For Data Integration," arXiv preprint arXiv: 2001.06543v1 [cs.DB], Jan. 17, 2020, (17 pages).

Li, Yuliang et al. "Deep Entity Matching With Pre-Trained Language Models," arXiv preprint arXiv: 2004.00584v3 [cs.DB], Sep. 2, 2020, (15 pages).

Mudgal, Sidharth et al. "Deep Learning For Entity Matching: A Design Space Exploration," Special Interest Group on Management of Data (SIGMOD) Association for Computing Machinery, Jun. 10-15, 2018, (18 pages), Houston, Texas, USA, DOI: 10.1145/3183713.3196926.

Zhao, Chen et al. "Auto-EM: End-To-End Fuzzy Entity-Matching Using Pre-Trained Deep Models and Transfer Learning," In The World Wide Web Conference, May 13, 2019, pp. 2413-2424, San Francisco, California, USA, DOI: 10.1145/3308558.3313578.

* cited by examiner

| Received Input Sequence | Comparison Input Sequence | Similarity Score |
|---|---|---|
| 3401 8 Mile Rd Melbourne KY 41039 | 3401 EIGHT MILE RD. Melbourne KY 410590000 | 1 |
| 3401 8 Mile Rd Melbourne KY 41039 | 2950 FLOYD ST Sarasota FL 342390000 | 0 |

601 ↗ (first row)
602 ↗ (second row)

MACHINE LEARNING TECHNIQUES FOR DETERMINING PREDICTED SIMILARITY SCORES FOR INPUT SEQUENCES

BACKGROUND

Various embodiments of the present invention address technical challenges related to performing semantic relatedness processing in a computationally efficient and predictively reliable manner. Existing semantic relatedness processing systems are ill-suited to efficiently and reliably perform input sequence pair similarity determinations.

BRIEF SUMMARY

In general, embodiments of the present invention provide methods, apparatuses, systems, computing devices, computing entities, and/or the like for dynamically generating a predicted similarity score for a pair of input sequences. According to one aspect, a predicted similarity score for a pair of input sequences is determined based at least in part on at least one of a token-level similarity probability score for the pair of input sequences, a target region match indication for the pair of input sequences, a fuzzy match score for the pair of input sequences, a character-level match score for the pair of input sequences, one or more similarity ratio occurrence indicators for the pair of input sequences, and a harmonic mean score of the fuzzy match score for the pair of input sequences and the token-level similarity probability score for the pair of input sequences.

In accordance with one aspect, a method includes: generating, using a processor, a token-level similarity probability score for the pair of input sequences, wherein generating the token-level similarity probability score comprises: generating a token-level embedded representation for each token in each input sequence, generating a cross-token image representation for each input sequence based at least in part on each token-level embedded representation for tokens of the input sequence, and generating the token-level similarity probability score based at least in part on each cross-token image representation; generating, using the processor and a similarity score determination machine learning model, the predicted similarity score based at least in part on the token-level similarity probability score; and performing, using the one or more processors, one or more prediction-based actions based at least in part on the predicted similarity score.

In accordance with another aspect, an apparatus comprising at least one processor and at least one memory including program code, the at least one memory and the program code configured to, with the processor, cause the apparatus to at least: generate a token-level similarity probability score for the pair of input sequences, wherein generating the token-level similarity probability score comprises: generating a token-level embedded representation for each token in each input sequence, generating a cross-token image representation for each input sequence based at least in part on each token-level embedded representation for tokens of the input sequence, and generating the token-level similarity probability score based at least in part on each cross-token image representation; generate, using a similarity score determination machine learning model, the predicted similarity score based at least in part on the token-level similarity probability score; and perform one or more prediction-based actions based at least in part on the predicted similarity score.

In accordance with yet another aspect, a computer program product computer program comprising at least one non-transitory computer-readable storage medium having computer-readable program code portions stored therein, the computer-readable program code portions configured to: generate a token-level similarity probability score for the pair of input sequences, wherein generating the token-level similarity probability score comprises: generating a token-level embedded representation for each token in each input sequence, generating a cross-token image representation for each input sequence based at least in part on each token-level embedded representation for tokens of the input sequence, and generating the token-level similarity probability score based at least in part on each cross-token image representation; generate, using a similarity score determination machine learning model, the predicted similarity score based at least in part on the token-level similarity probability score; and perform one or more prediction-based actions based at least in part on the predicted similarity score.

BRIEF DESCRIPTION OF THE DRAWINGS

Figure 1:
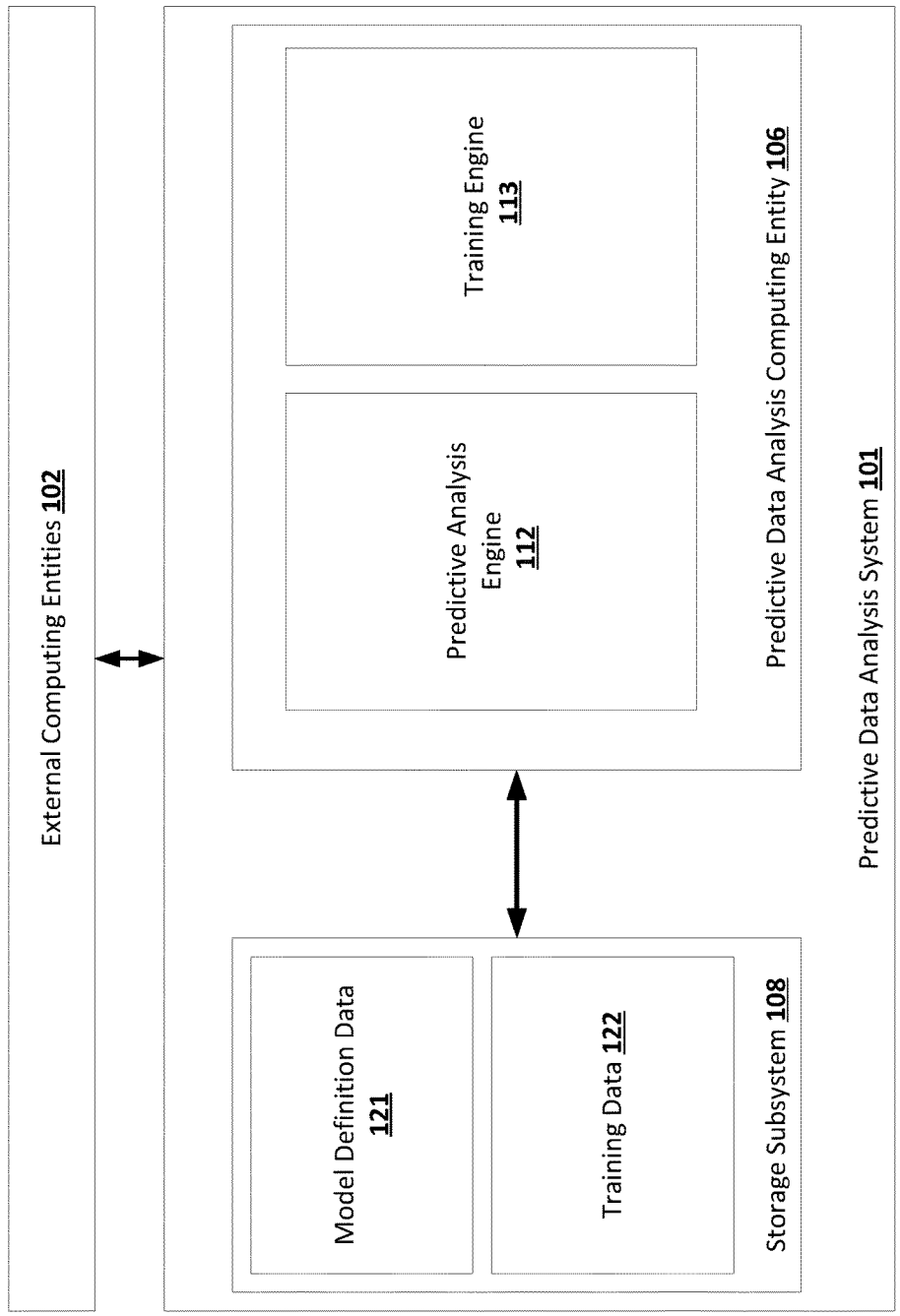
Figure 2:
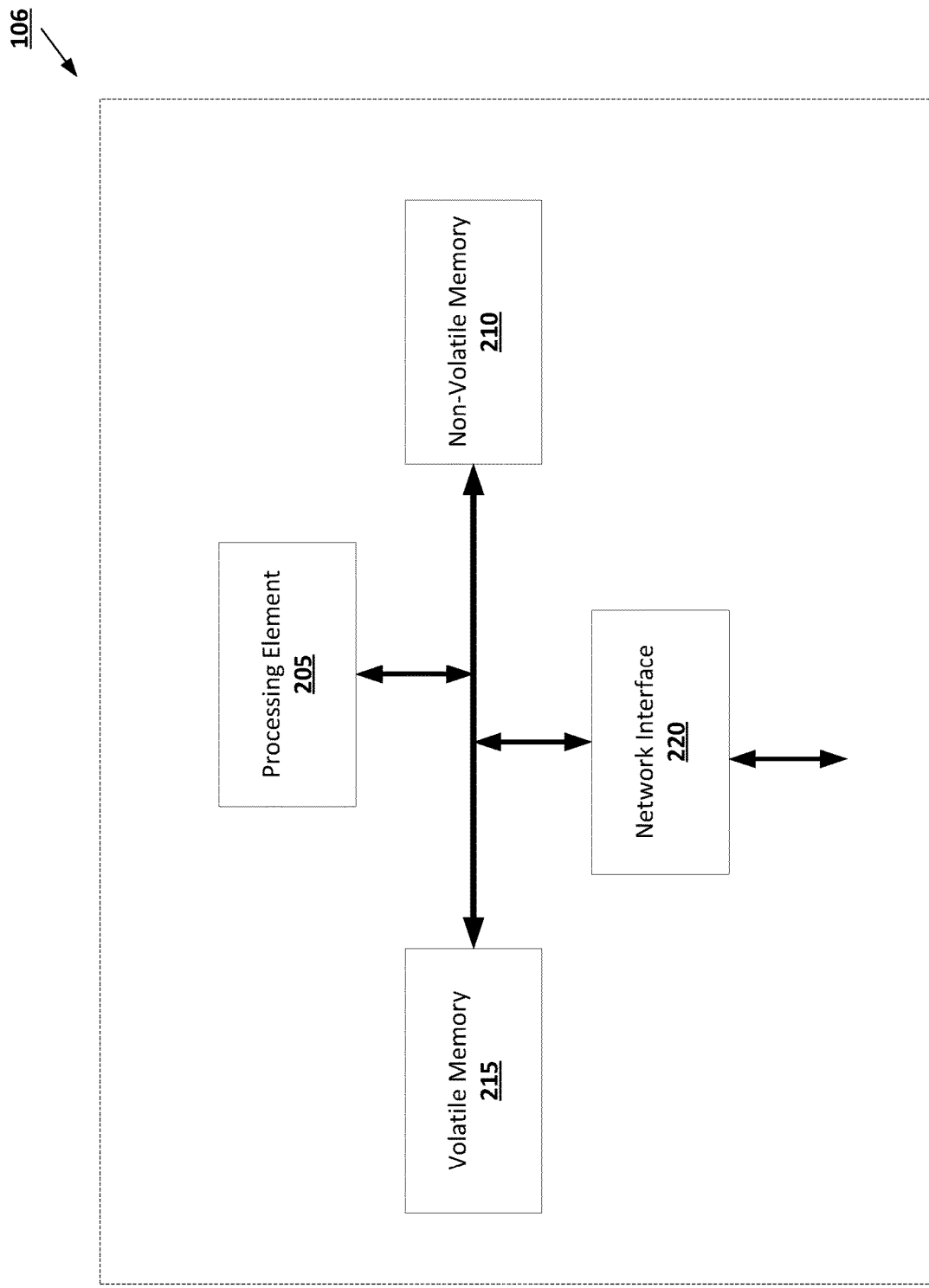
Figure 3:
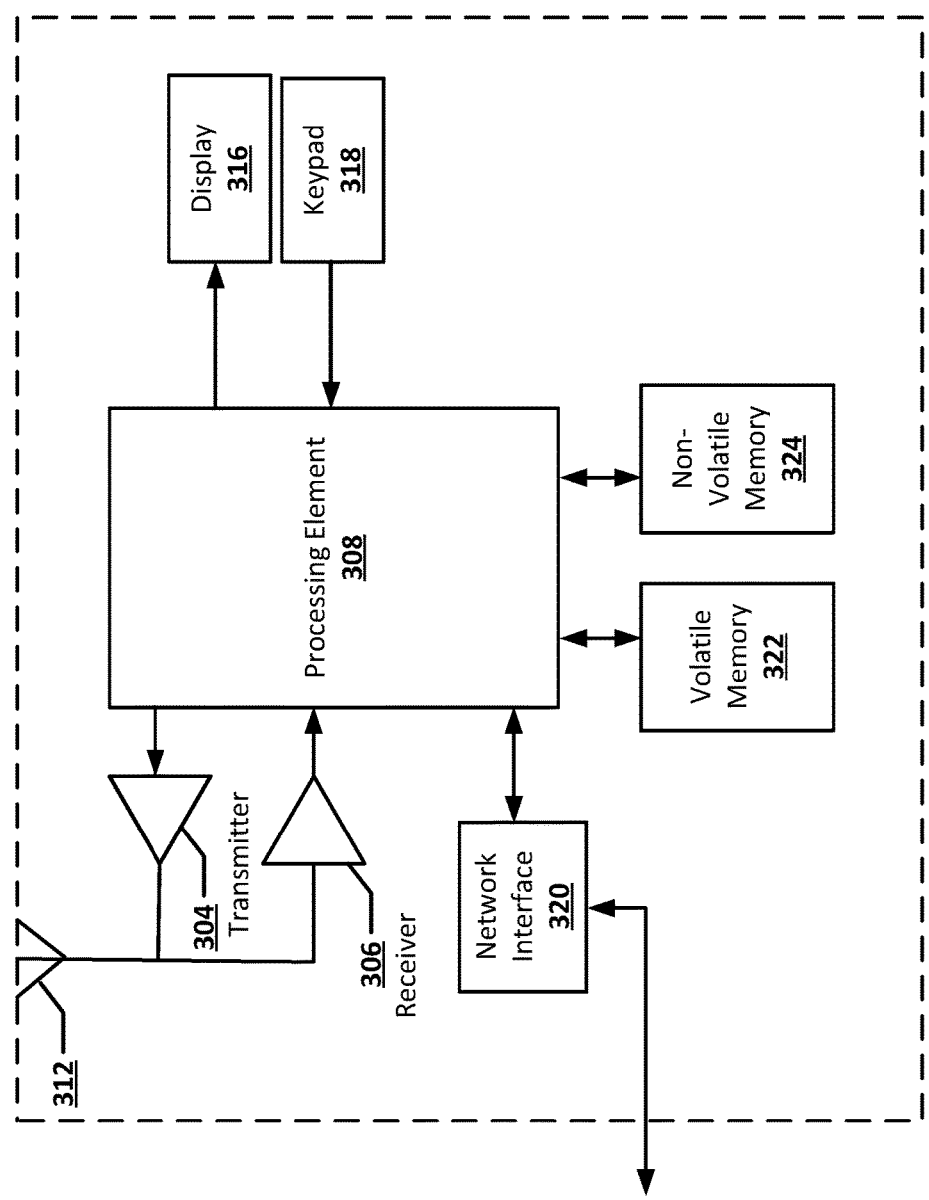
Figure 4:
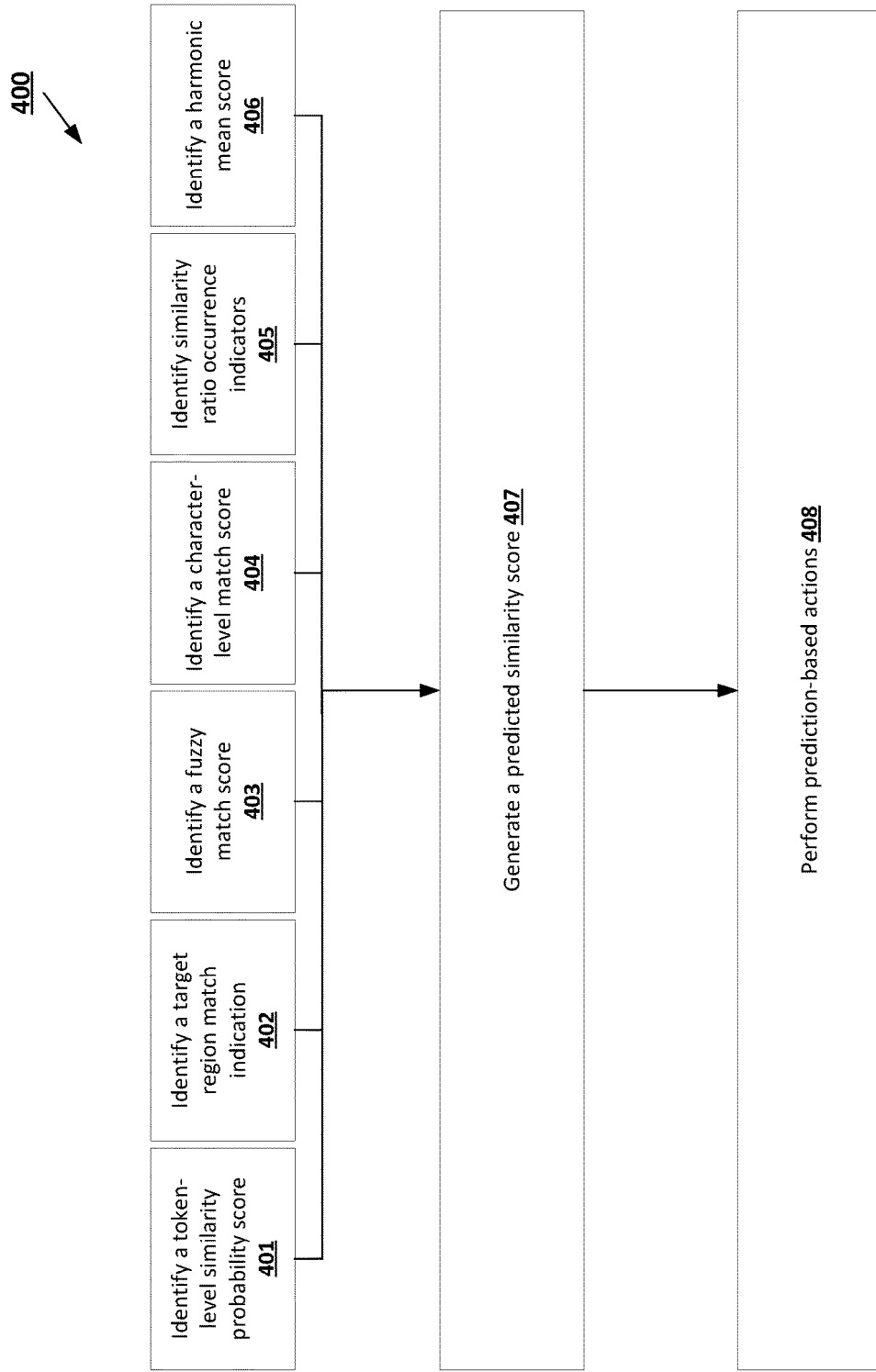
Figure 5:
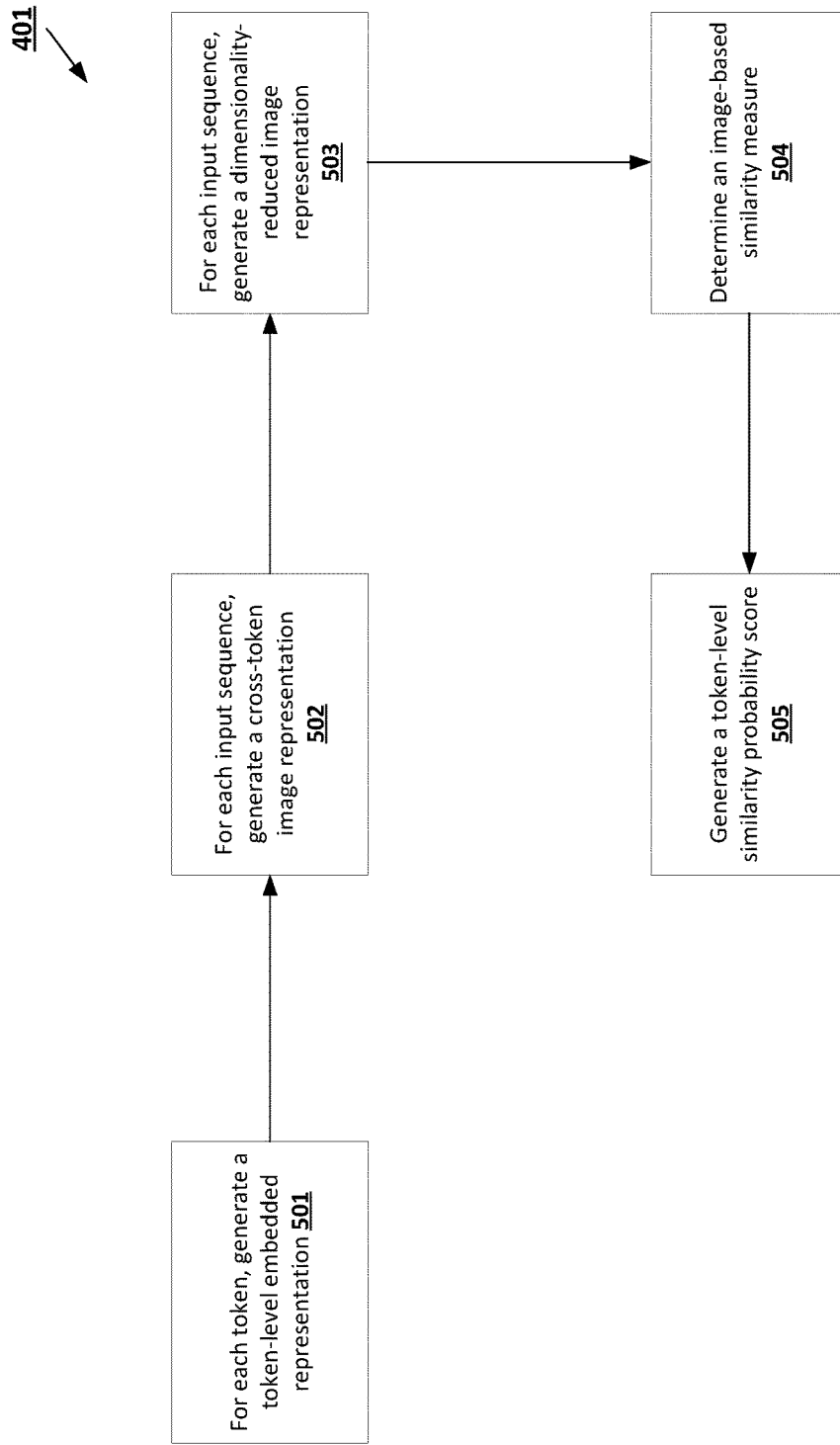
Figure 7:

Having thus described the invention in general terms, reference will now be made to the accompanying drawings, which are not necessarily drawn to scale, and wherein:

FIG. 1 provides an exemplary overview of an architecture that can be used to practice embodiments of the present invention;

FIG. 2 provides an example predictive data analysis computing entity in accordance with some embodiments discussed herein;

FIG. 3 provides an example external computing entity in accordance with some embodiments discussed herein;

FIG. 4 is a flowchart diagram of an example process for generating a predicted similarity score for a pair of input sequences in accordance with some embodiments discussed herein;

FIG. 5 is a flowchart diagram of an example process for generating a token-level similarity probability score for a pair of input sequences in accordance with some embodiments discussed herein; and FIGS. 6-7 provide operational examples of two prediction output user interfaces in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention introduce techniques for performing database integration/consolidation. In one exemplary embodiment, given an input sequence $S_1$ for a record $R_1$ of database $D_1$ and an input sequence $S_2$ for a record $R_2$ of database $D_2$, if a predicted similarity score for $S_1$ and $S_2$ satisfies a predicted similarity score threshold, then $R_1$ and $R_2$ may be consolidated/integrated into a common record. As another example, given an input sequence $S_1$ for an incoming record $R_1$ for database $D_1$ and an input sequence $S_2$ for an existing record $R_2$ of $D_2$, if a predicted similarity score for $S_1$ and $S_2$ satisfies a predicted similarity score threshold, then $R_1$ may be consolidated/integrated into $R_2$.

By disclosing techniques for performing database integration/consolidation, various embodiments of the present invention introduce techniques that reduce the need for storage requirements for storing databases, as duplicate errors will be more storage-intensive than integrated/consolidated. Moreover, once integrated/consolidated, databases can be queried with greater efficiency and speed relative to unintegrated/non-consolidated databases. In this way, various embodiments of the present invention improve the efficiency of storing and querying databases, and make important technical contributions to the field of database systems.

An exemplary application of various embodiments of the present invention relates to matching address sequences/strings. In some embodiments, an input text sequence comprising a first address string is filtered to remove duplicate words or other anomalies. Next, a regular expression (regex) pattern matching is used to extract a zip code and/or associated address string from the database. A pre-processing layer may generate one or more additional binary features indicative of at least whether the pair of address strings 100% match and whether the zip codes match. Further, the pre-processing layer determines a fuzzy-match score between the data pair using token sort ratio or WRatio as a percentage. In some embodiments, a Word2Vec neural network model may train word level embeddings for each address string of the data pair using a Skip-gram model and preconfigured value for the associated context window (e.g., 2). The embeddings are generated as a n-dimensional vector. This may be useful to generate a feature so non-standard abbreviations can be assigned the same embedding as the original word. Both address strings comprising the data pair are each associated with an n-dimensional embedding vector. The number of tokens in each address string may be variable. As such, each address string is treated as an image and the maximum number of tokens in a string for all data is determined and the rest of the sentences are padded with 0s. The address strings to be compared are passed into a convolution 1 D architecture with the width equivalent to the number of determined tokens and the height equivalent to the embedded vector dimensionality. The Euclidean distance of the encoding vectors may be determined and multiplied by the reciprocal of the 1+fuzzy-match score to give a similarity score (1−sigmoid output) indicative of whether the input text and the one or more extracted data values from the database are the same. The harmonic mean of the similarity score may also be determined.

II. Definitions of Certain Terms

The term "token-level similarity probability score" may refer to a data entity that is configured to describe a similarity measure for a pair of input sequences that is determined based at least in part on each token-level embedded representation for a token in one of the pair of input sequences. For example, if the pair of input sequences includes an input sequence $S_1$ that includes tokens $T_1$-$T_5$ and an input sequence $S_2$ that includes tokens $T_6$-$T_9$, then the token-level similarity probability score for the two input sequences may be determined based at least in part on the token-level embedded representation for $T_1$, the token-level embedded representation for $T_2$, the token-level embedded representation for $T_3$, the token-level embedded representation for $T_4$, the token-level embedded representation for $T_5$, the token-level embedded representation for $T_6$, the token-level embedded representation for $T_7$, the token-level embedded representation for $T_8$, and the token-level embedded representation for $T_9$. In some embodiments, to determine the token-level similarity probability score for a pair of input sequences, a predictive data analysis computing entity first combines the token-level embedded representations for each input sequence into a cross-token image representation of the input sequence, and then determines the token-level similarity probability score based at least in part on each cross-token image representation for an input sequences. For example, if the pair of input sequences includes an input sequence $S_1$ that includes tokens $T_1$-$T_5$ and an input sequence $S_2$ that includes tokens $T_6$-$T_9$, then the token-level similarity probability score for the two input sequences may be determined based at least in part on: (i) a first cross-token image representation for $S_1$ that is determined based at least in part on the token-level embedded representation for $T_1$, the token-level embedded representation for $T_2$, the token-level embedded representation for $T_3$, the token-level embedded representation for $T_4$, and the token-level embedded representation for $T_5$, and (ii) a second cross-token image representation that is determined based at least in part on the token-level embedded representation for $T_6$, the token-level embedded representation for $T_7$, the token-level embedded representation for $T_8$, and the token-level embedded representation for $T_9$. In some of the noted embodiments, the token-level similarity probability score may be determined based on a sigmoid value, where the sigmoid value is the output of applying a Sigmoid function to an image-based similarity measure for the first cross-token image representation and the second cross-token image representation (e.g., where the image-based similarity measure may be a similarity measure for a convolutional representation of the first cross-token image representation and a convolutional representation of the second cross-token image representation). In some of the noted embodiments, the token-level similarity probability score is determined based on the output of (1−sigmoid).

The term "token-level embedded representation" may refer to a data entity that is configured to describe a fixed-size (e.g., fifty-dimensional) representation of a corresponding token. For example, the token-level embedded representation for a token may be generated based at least in part on the output of processing an input representation of the token (e.g., the token itself) using a word embedding machine learning model, such as the Word2Vec model (e.g., a skip-gram-based Word2Vec model having a defined number of output dimensions, such as fifty output dimensions). As another example, the token-level embedded representation for a token may be generated based at least in part on the output of processing an input representation of the token (e.g., the token itself) using a natural-language-based machine learning model. As yet another example, the token-level embedded representation for a token may be generated based at least in part on the output of processing an image representation of the token using an image-based machine learning model, such as an image-based machine learning model that includes a convolutional neural network machine learning model.

The term "cross-token image representation" may refer to a data entity that is configured to describe an image representation of a visualization generated using each token-level embedded representation for a token of a corresponding input sequence. For example, in some embodiments, the cross-token image representation is an image representation of a two-dimensional visualization having m horizontal segments (e.g., rows) and n vertical segments (e.g., columns), where each horizontal segment corresponds to (e.g., describes, depicts textual data for, and/or the like) a corresponding dimension of m dimensions of the token-level embedded representations for the tokens of the input sequence, and consequently each vertical segment corresponds to (e.g., describes, depicts textual data for, and/or the like) a token-level embedded representation of a corresponding token of n tokens in the input sequence (accordingly, the m horizontal segments are associated with m token-level embedded representation dimensions and the n vertical segments are associated with n tokens). In some of the noted embodiments, if n fails to satisfy (e.g., falls below) a token count threshold for a predictive data analysis system, then the two-dimensional visualization is padded with pre-defined default horizontal segment values (e.g., with all zero horizontal segment values) so that the two-dimensional visualization has m horizontal segments. In some embodiments, generating the cross-token image representation for an input sequence is performed based at least in part on a padded input sequence for the input sequence, and each padded input sequence is generated based at least in part on the token count threshold. In some embodiments, the token count threshold is nine.

The term "dimensionality-reduced image representation" may refer to a data entity that is configured to describe a one-dimensional representation of an image representation of a corresponding input sequence. For example, the dimensionality-reduced image representation of a corresponding input sequence may be a one-dimensional representation of a cross-token image representation for the input sequence. In some embodiments, to generate a dimensionality-reduced image representation based at least in part on a cross-token image representation, the cross-token image representation is processed using a one-dimensional convolutional neural network machine learning model. In some embodiments, to generate the dimensionality-reduced image representation for an input sequence, the cross-token image representation is processed using an image processing operation that is configured to generate a one-dimensional representation of the cross-token image representation, such as using a one-dimensional convolutional operation. In some embodiments, the convolutional filter of the convolutional operation is configured to capture, at each time, a subset of all of the token-level embedded representations depicted by a cross-token image representation. Accordingly, if each vertical segment of the cross-token image representation corresponds to a token-level embedded representation for a particular input sequence and each horizontal segment to a particular dimension of token-level embedded representations, then the convolutional filter may at each time span across all of the vertical dimension and a portion of the horizontal dimension.

The term "image-based similarity measure" may refer to a data entity that is configured to describe a similarity/difference measure for a pair of image-based representations of a corresponding pair of input sequences. For example, given an input sequence $S_1$ that is associated with the image-based representation $I_1$ and an input sequence $S_2$ that is associated with the image-based representation $I_2$, the image-based similarity measure for $S_1$ and $S_2$ may be a similarity/difference measure for $I_1$ and $I_2$. As another example, given an input sequence $S_1$ that is associated with the image-based representation $I_1$ having a dimensionality-reduced image representation $E_1$ and an input sequence $S_2$ that is associated with the image-based representation $I_2$ having a dimensionality-reduced image representation $E_2$, the image-based similarity measure for $S_1$ and $S_2$ may be a similarity/difference measure for $E_1$ and $E_2$. In some embodiments, the image-based similarity measure for a pair of input sequences is determined based at least in part on a vector-wise distance measure of the dimensionality-reduced image representations of the pair, such as based at least in part on a Euclidean distance of the dimensionality-reduced image representations of the pair. For example, given an input sequence $S_1$ that is associated with the image-based representation $I_1$ having a dimensionality-reduced image representation $E_1$ and an input sequence $S_1$ that is associated with the image-based representation $I_2$ having a dimensionality-reduced image representation $E_2$, the image-based similarity measure for $S_1$ and $S_2$ may be determined based at least in part on a Euclidean distance measure for $E_1$ and $E_2$.

The term "target region match indication" may refer to a data entity that is configured to describe whether a target region (e.g., a number-defining region, a zip-code-defining region, a state/province-name defining region, and/or the like) of a first input sequence in a corresponding pair of input sequences is an exact match for the target region of a second input sequence in the corresponding pair of input sequences. For example, the target region match indication for a pair of input sequences may describe whether a zip code extracted from a first input sequence is an exact match for a zip code extracted from a second input sequence. In some embodiments, to determine a target region match indication for a pair of input sequences, a predictive data analysis computing entity: (i) extracts a first target region of a first input sequence based at least in part on target region extraction configuration data, (ii) extracts a second target region of a second input sequence based at least in part on the target region extraction configuration data, (iii) determines a match indicator describing whether the two target regions are an exact match, and (iv) determines the target region match indication based at least in part on the noted match indicator.

The term "character level match score" may refer to a data entity that is configured to describe a measure of similarity of a pair of input sequences based at least in part on a character distribution of the first input sequence in the pair of input sequences and a character distribution of the second input sequence in the pair of input sequences. For example, in some embodiments, the character level match score for a pair of input sequences is determined based at least in part on a ratio of a count of common characters across the pair of input sequences and a total count of characters of the pair of input sequences. As another example, in some embodiments, the character level match score for a pair of input sequences is determined based at least in part on a ratio of a count of unique common characters across the pair of input sequences and a total count of unique characters of the pair of input sequences. In some embodiments, the characters are selected from a character encoding scheme such as a Unicode character encoding scheme and/or an American Standard Code for Information Interchange (ASCII) character encoding scheme.

The term "similarity ratio occurrence indicator" may refer to a data entity that is configured to describe whether a corresponding pair of input sequences have a similarity score as computed by a string matching model that satisfies a threshold similarity score that is associated with the similarity ratio occurrence indicator. In some embodiments, to determine a similarity ratio occurrence indicator that is associated with a particular threshold similarity score, a predictive data analysis computing entity: (i) uses a similarity score determination machine learning model to determine an inferred similarity score for the pair of input sequences, (ii) determines whether the similarity score satisfies the particular threshold similarity score, (ii) if the similarity score satisfies the particular threshold similarity score, determines an affirmative similarity ratio occurrence indicator, and (iv) if the similarity score fails to satisfy the particular threshold similarity score, determines a negative similarity ratio occurrence indicator. Examples of similarity ratio occurrence indicators include a similarity ratio occurrence indicator describing whether the pair of input sequences are deemed to be at least thirty percent similar, a similarity ratio occurrence indicator describing whether the pair of input sequences are deemed to be at least fifty percent similar, a similarity ratio occurrence indicator describing whether the pair of input sequences are deemed to be at least eighty percent similar, a similarity ratio occurrence indicator describing whether the pair of input sequences are deemed to be one hundred percent similar and/or the like.

The term "similarity score determination machine learning model" may refer to a data entity that is configured to describe a machine learning model that is configured to generate a predicted similarity score for a pair of input sequences based at least in part on at least one of the token-level similarity probability score for the pair of input sequences, the target region match indication for the pair of input sequences, the fuzzy match score for the pair of input sequences, the character-level match score for the pair of input sequences, one or more similarity ratio occurrence indicators for the pair of input sequences, and the harmonic mean score of the fuzzy match score for the pair of input sequences and the token-level similarity probability score for the pair of input sequences. In some embodiments, the similarity score determination machine learning model may be a fully-connected machine learning model that is configured to generate a predicted similarity score for a pair of input sequences based at least in part on at least one of the token-level similarity probability score for the pair of input sequences, the target region match indication for the pair of input sequences, the fuzzy match score for the pair of input sequences, the character-level match score for the pair of input sequences, one or more similarity ratio occurrence indicators for the pair of input sequences, and the harmonic mean score of the fuzzy match score for the pair of input sequences and the token-level similarity probability score for the pair of input sequences. In some embodiments, the similarity score determination machine learning model may be a Cat-Boost machine learning model that is configured to generate a predicted similarity score for a pair of input sequences based at least in part on at least one of the token-level similarity probability score for the pair of input sequences, the target region match indication for the pair of input sequences, the fuzzy match score for the pair of input sequences, the character-level match score for the pair of input sequences, one or more similarity ratio occurrence indicators for the pair of input sequences, and the harmonic mean score of the fuzzy match score for the pair of input sequences and the token-level similarity probability score for the pair of input sequences. In some embodiments, inputs to the similarity score determination machine learning model comprise vectors each corresponding to one of the token-level similarity probability score for the pair of input sequences, the target region match indication for the pair of input sequences, the fuzzy match score for the pair of input sequences, the character-level match score for the pair of input sequences, one or more similarity ratio occurrence indicators for the pair of input sequences, and the harmonic mean score of the fuzzy match score for the pair of input sequences and the token-level similarity probability score for the pair of input sequences. In some embodiments, outputs of the similarity score determination machine learning model comprise an atomic value or a vector describing the predicted similarity score for the pair of input sequences.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing predictive data analysis operations and for performing one or more prediction-based actions (e.g., generating one or more modified text sequences). The system architecture 100 includes a predictive data analysis system 101 comprising a predictive data analysis computing entity 106 configured to generate predictive outputs that can be used to perform one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 is to a generate similarity score for a pair of sentences/data records.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to train a prediction model based at least in part on the training data 122 stored in the storage subsystem 108, store trained prediction models as part of the model definition data 121 stored in the storage subsystem 108, utilize trained models to generate predictions based at least in part on prediction inputs provided by an external computing entity 102, and perform prediction-based actions based at least in part on the generated predictions. The storage subsystem may be configured to store the model definition data 121 for one or more predictive analysis models and the training data 122 uses to train one or more predictive analysis models. The predictive data analysis computing entity 106 may be configured to receive requests and/or data from external computing entities 102, process the requests and/or data to generate predictive outputs and provide the predictive outputs to the external computing entities 102. The external computing entity 102 may periodically update/provide raw input data (e.g., data objects describing an input text sequence) to the predictive data analysis system 101.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 106 includes a predictive analysis engine 112 and a training engine 113. The predictive analysis engine 112 may be configured to perform predictive data analysis based at least in part on a received input text sequence. For example, the predictive analysis engine 112 may be configured to one or more prediction based actions based at least in part on an overall emotional sentiment score. The training engine 113 may be configured to train the predictive analysis engine 112 in accordance with the training data 122 stored in the storage subsystem 108.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present invention introduce techniques for performing database integration/consolidation. By disclosing techniques for performing database integration/consolidation, various embodiments of the present invention introduce techniques that reduce the need for storage requirements for storing databases, as duplicate errors will be more storage-intensive than integrated/consolidated. Moreover, once integrated/consolidated, databases can be queried with greater efficiency and speed relative to unintegrated/non-consolidated databases. In this way, various embodiments of the present invention improve the efficiency of storing and querying databases, and make important technical contributions to the field of database systems.

FIG. 4 is a flowchart diagram of an example process 400 for dynamically determining a predicted similarity score between a pair of input sequences. Via the various steps/operations of the process 400, the predictive data analysis computing entity 106 can generate informed inferences about similarity of input sequences based at least in part on a combination of holistic features of the input sequences that describe the input sequences in entirety, partial features of the input sequences that describe target subsequences of input sequences, and token-level features of the input sequences that describe properties of individual tokens of input sequences.

The process 400 begins at operation 401 when the predictive data analysis computing entity 106 identifies a token-level similarity probability score for the pair of input sequences. In some embodiments, the token-level similarity probability score is a token-level measure of similarity for the pair of input sequences that is configured to enable generating predictive insights about how individual tokens of the pair of input sequences contribute to an inferred similarity measure for the pair of input sequences. An example of a token of an input sequence is a word of an input sequence that includes a string, such as an address string.

In some embodiments, a token-level similarity probability score is a similarity measure for a pair of input sequences that is determined based at least in part on each token-level embedded representation for a token in one of the pair of input sequences. For example, if the pair of input sequences includes an input sequence $S_1$ that includes tokens $T_1$-$T_5$ and an input sequence $S_2$ that includes tokens $T_6$-$T_9$, then the token-level similarity probability score for the two input sequences may be determined based at least in part on the token-level embedded representation for $T_1$, the token-level embedded representation for $T_2$, the token-level embedded representation for $T_3$, the token-level embedded representation for $T_4$, the token-level embedded representation for $T_5$, the token-level embedded representation for $T_6$, the token-level embedded representation for $T_7$, the token-level embedded representation for $T_8$, and the token-level embedded representation for $T_9$.

In some embodiments, to determine the token-level similarity probability score for a pair of input sequences, the predictive data analysis computing entity 106 first combines the token-level embedded representations for each input sequence into a cross-token image representation of the input sequence, and then determines the token-level similarity probability score based at least in part on each cross-token image representation for an input sequences. For example, if the pair of input sequences includes an input sequence $S_1$ that includes tokens $T_1$-$T_5$ and an input sequence $S_2$ that includes tokens $T_6$-$T_9$, then the token-level similarity probability score for the two input sequences may be determined based at least in part on: (i) a first cross-token image representation for $S_1$ that is determined based at least in part on the token-level embedded representation for $T_1$, the token-level embedded representation for $T_2$, the token-level embedded representation for $T_3$, the token-level embedded representation for $T_4$, and the token-level embedded representation for $T_5$, and (ii) a second cross-token image representation that is determined based at least in part on the token-level embedded representation for $T_6$, the token-level embedded representation for $T_7$, the token-level embedded representation for $T_8$, and the token-level embedded representation for $T_9$.

In some embodiments, step/operation 401 may be performed in accordance with the process that is depicted in FIG. 5. The process that is depicted in FIG. 5 begins at step/operation 501 when the predictive data analysis computing entity 106 generates a token-level embedded representation for each token that occurs in the input sequence. In some embodiments, prior to step/operation 501, the input sequences are refined by removing those tokens deemed insignificant (e.g., stop word tokens) based at least in part on token significance configuration data associated with the predictive data analysis system 101, and thus step/operation 501 effectively generates a token-level embedded representation for each significant token in the pair of input sequences.

In some embodiments, a token-level embedded representation describes a fixed-size (e.g., fifty-dimensional) representation of a corresponding token. For example, the token-level embedded representation for a token may be generated based at least in part on the output of processing an input representation of the token (e.g., the token itself) using a word embedding machine learning model, such as the Word2Vec model (e.g., a skip-gram-based Word2Vec model having a defined number of output dimensions, such as fifty output dimensions). As another example, the token-level embedded representation for a token may be generated based at least in part on the output of processing an input representation of the token (e.g., the token itself) using a natural-language-based machine learning model. As yet another example, the token-level embedded representation for a token may be generated based at least in part on the output of processing an image representation of the token using an image-based machine learning model, such as an image-based machine learning model that includes a convolutional neural network machine learning model.

At step/operation 502, the predictive data analysis computing entity 106 generates a cross-token image representation of each input sequence based at least in part on the token-level embedded representations of the tokens associated with the input sequence. In some embodiments, the predictive data analysis computing entity 106 generates a cross-token image representation of each input sequence using an image representation of a geometrically contiguous combination of the token-level embedded representations of the tokens associated with the input sequence.

In some embodiments, a cross-token image representation describes an image representation of a visualization generated using each token-level embedded representation for a token of a corresponding input sequence. For example, in some embodiments, the cross-token image representation is an image representation of a two-dimensional visualization having m horizontal segments (e.g., rows) and n vertical segments (e.g., columns), where each horizontal segment corresponds to (e.g., describes, depicts textual data for, and/or the like) a corresponding dimension of m dimensions of the token-level embedded representations for the tokens of the input sequence, and consequently each vertical segment corresponds to (e.g., describes, depicts textual data for, and/or the like) a token-level embedded representation of a corresponding token of n tokens in the input sequence (accordingly, the m horizontal segments are associated with m token-level embedded representation dimensions and the n vertical segments are associated with n tokens). In some of the noted embodiments, if n fails to satisfy (e.g., falls below) a token count threshold for the predictive data analysis system 101, then the two-dimensional visualization is padded with pre-defined default horizontal segment values (e.g., with all zero horizontal segment values) so that the two-dimensional visualization has m horizontal segments. In some embodiments, generating the cross-token image representation for an input sequence is performed based at least in part on a padded input sequence for the input sequence, and each padded input sequence is generated based at least in part on the token count threshold. In some embodiments, the token count threshold is nine.

At step/operation 503, the predictive data analysis computing entity 106 determines a dimensionality-reduced image representation for each input sequence based at least in part on the cross-token image representation for the input sequence. In some embodiments, to generate the dimensionality-reduced image representation for an input sequence, the cross-token image representation is processed using an image processing operation that is configured to generate a one-dimensional representation of the cross-token image representation, such as using a one-dimensional convolutional operation.

In some embodiments, a dimensionality-reduced image representation describes a one-dimensional representation of an image representation of a corresponding input sequence. For example, the dimensionality-reduced image representation of a corresponding input sequence may be a one-dimensional representation of a cross-token image representation for the input sequence. In some embodiments, to generate a dimensionality-reduced image representation based at least in part on a cross-token image representation, the cross-token image representation is processed using a one-dimensional convolutional neural network machine learning model. In some embodiments, to generate the dimensionality-reduced image representation for an input sequence, the cross-token image representation is processed using an image processing operation that is configured to generate a one-dimensional representation of the cross-token image representation, such as using a one-dimensional convolutional operation.

At step/operation 504, the predictive data analysis computing entity 106 determines an image-based similarity measure for the pair of input sequences based at least in part on each dimensionality-reduced image representation for an input sequence in the pair of input sequences. For example, the predictive data analysis computing entity 106 may determine the image-bases similarity measure based at least in part on a Euclidean distance measure of each dimensionality-reduced image representation for an input sequence in the pair of input sequences.

In some embodiments, an image-based similarity measure describes a similarity/difference measure for a pair of image-based representations of a corresponding pair of input sequences. For example, given an input sequence $S_1$ that is associated with the image-based representation I and an input sequence $S_2$ that is associated with the image-based representation $I_2$, the image-based similarity measure for $S_1$ and $S_2$ may be a similarity/difference measure for $I_1$ and $I_2$. As another example, given an input sequence $S_1$ that is associated with the image-based representation $I_1$ having a dimensionality-reduced image representation $E_1$ and an input sequence $S_2$ that is associated with the image-based representation $I_2$ having a dimensionality-reduced image representation $E_2$, the image-based similarity measure for $S_1$ and $S_2$ may be a similarity/difference measure for $E_1$ and $E_2$. In some embodiments, the image-based similarity measure for a pair of input sequences is determined based at least in part on a vector-wise distance measure of the dimensionality-reduced image representations of the pair, such as based at least in part on a Euclidean distance of the dimensionality-reduced image representations of the pair. For example, given an input sequence $S_1$ that is associated with the image-based representation $I_1$ having a dimensionality-reduced image representation $E_1$ and an input sequence $S_2$ that is associated with the image-based representation $I_2$ having a dimensionality-reduced image representation $E_2$, the image-based similarity measure for $S_1$ and $S_2$ may be determined based at least in part on a Euclidean distance measure for $E_1$ and $E_2$.

At step/operation 505, the predictive data analysis computing entity 106 determines the token-level similarity probability score based at least in part on the image-based similarity measure. In some embodiments, to generate the token-level similarity probability score for a pair of input sequences, the predictive data analysis computing entity 106: (i) computes a first value based at least in part on the image-based similarity measure and a fuzzy match score for the pair of input sequences (e.g., based at least in part on a ratio of the image-based similarity measure and the fuzzy match score), and (ii) determines the token-level similarity probability score based at least in part on the first value. In some embodiments, to generate the token-level similarity probability score for a pair of input sequences, the predictive data analysis computing entity 106: (i) computes a first value based at least in part on the image-based similarity measure and a fuzzy match score for the pair of input sequences (e.g., based at least in part on a ratio of the image-based similarity measure and the fuzzy match score plus one), (ii) determines the token-level similarity probability score by processing the first value using a machine learning model that comprises at least a sigmoid processing layer in order to generate a model output, and (iii) determines the token-level similarity probability score based at least in part on the model output (e.g., based at least in part on (1−model output)).

Returning to FIG. 4, at step/operation 402, the predictive data analysis computing entity 106 identifies a target region match indication for the pair of input sequences. In some embodiments, a target region match indication describes whether a target region (e.g., a number-defining region, a zip-code-defining region, a state/province-name defining region, and/or the like) of a first input sequence in a corresponding pair of input sequences is an exact match for the target region of a second input sequence in the corresponding pair of input sequences. For example, the target region match indication for a pair of input sequences may describe whether a zip code extracted from a first input sequence is an exact match for a zip code extracted from a second input sequence. In some embodiments, to determine a target region match indication for a pair of input sequences, the predictive data analysis computing entity 106: (i) extracts a first target region of a first input sequence based at least in part on target region extraction configuration data, (ii) extracts a second target region of a second input sequence based at least in part on the target region extraction configuration data, (iii) determines a match indicator describing whether the two target regions are an exact match, and (iv) determines the target region match indication based at least in part on the noted match indicator.

At step/operation 403, the predictive data analysis computing entity 106 identities a fuzzy match score for the pair of input sequences. In some embodiments, the fuzzy match score for the pair of input sequences is determined using a fuzzy match score generation technique, such as a fuzzy match score generation technique using at least one of token sort ratios and WRatios.

At step/operation 404, the predictive data analysis computing entity 106 identifies a character-level match score for the pair of input sequences. In some embodiments, the character level match score describes a measure of similarity of a pair of input sequences based at least in part on a character distribution of the first input sequence in the pair of input sequences and a character distribution of the second input sequence in the pair of input sequences. For example, in some embodiments, the character level match score for a pair of input sequences is determined based at least in part on a ratio of a count of common characters across the pair of input sequences and a total count of characters of the pair of input sequences. As another example, in some embodiments, the character level match score for a pair of input sequences is determined based at least in part on a ratio of a count of unique common characters across the pair of input sequences and a total count of unique characters of the pair of input sequences. In some embodiments, the characters are selected from a character encoding scheme such as a Unicode character encoding scheme and/or an American Standard Code for Information Interchange (ASCII) character encoding scheme.

At step/operation 405, the predictive data analysis computing entity 106 identifies one or more similarity ratio occurrence indicators for the pair of input sequences. For example, the predictive data analysis computing entity 106 may identify a first similarity ratio occurrence indicator describing whether the pair of input sequences are deemed to be at least thirty percent similar, a second similarity ratio occurrence indicator describing whether the pair of input sequences are deemed to be at least fifty percent similar, a third similarity ratio occurrence indicator describing whether the pair of input sequences are deemed to be at least eighty percent similar, and/or the like.

In some embodiments, a similarity ratio occurrence indicator may describe whether a corresponding pair of input sequences have a similarity score as computed by a string matching model that satisfies a threshold similarity score that is associated with the similarity ratio occurrence indicator. In some embodiments, to determine a similarity ratio occurrence indicator that is associated with a particular threshold similarity score, the predictive data analysis computing entity 106: (i) uses a similarity score determination machine learning model to determine an inferred similarity score for the pair of input sequences, (ii) determines whether the similarity score satisfies the particular threshold similarity score, (ii) if the similarity score satisfies the particular threshold similarity score, determines an affirmative similarity ratio occurrence indicator, and (iv) if the similarity score fails to satisfy the particular threshold similarity score, determines a negative similarity ratio occurrence indicator. Examples of similarity ratio occurrence indicators include a similarity ratio occurrence indicator describing whether the pair of input sequences are deemed to be at least thirty percent similar, a similarity ratio occurrence indicator describing whether the pair of input sequences are deemed to be at least fifty percent similar, a similarity ratio occurrence indicator describing whether the pair of input sequences are deemed to be at least eighty percent similar, and/or the like.

At step/operation 406, the predictive data analysis computing entity 106 determines a harmonic mean score of the fuzzy match score for the pair of input sequences and the token-level similarity probability score for the pair of input sequences. In some embodiments, the harmonic mean score is a harmonic mean that is determined based at least in part on a Siamese network score for the pair of input sequences and/or a fuzzy match score for the pair of input sequences. In some embodiments, the harmonic mean score is a harmonic mean of the fuzzy match score for the pair of input sequences and the Siamese network score for the pair of input sequences. In some embodiments, the Siamese network score for the pair of input sequences is determined based at least in part on an output of processing the pair of input sequences using a modified Siamese neural network machine learning model. Aspects of Siamese neural network machine learning models are described in David Chicco, Siamese Neural Networks: An Overview in Methods in Molecular Biology (MIMB, volume 2190) (2020), available online at https://link.springer.com/protocol/10.1007%2F978-1-0716-0826-5_3.

At step/operation 407, the predictive data analysis computing entity 106 determines the predicted similarity score for the pair of input sequences based at least in part on the token-level similarity probability score, the target region match indication, the fuzzy match score, the character-level match score, the one or more similarity ratio occurrence indicators, and the harmonic mean score (of the fuzzy match score for the pair of input sequences and the token-level similarity probability score for the pair of input sequences). In some embodiments, to generate the predicted similarity score, the predictive data analysis computing entity 106 processes the token-level similarity probability score, the target region match indication, the fuzzy match score, the character-level match score, the one or more similarity ratio occurrence indicators, and the harmonic mean score of the fuzzy match score for the pair of input sequences and the token-level similarity probability score for the pair of input sequences using a similarity score determination machine learning model to generate the predicted similarity.

The similarity score determination machine learning model may be configured to generate a predicted similarity score for a pair of input sequences based at least in part on at least one of the token-level similarity probability score for the pair of input sequences, the target region match indication for the pair of input sequences, the fuzzy match score for the pair of input sequences, the character-level match score for the pair of input sequences, one or more similarity ratio occurrence indicators for the pair of input sequences, and the harmonic mean score of the fuzzy match score for the pair of input sequences and the token-level similarity probability score for the pair of input sequences.

In some embodiments, the similarity score determination machine learning model may be a fully-connected machine learning model that is configured to generate a predicted similarity score for a pair of input sequences based at least in part on at least one of the token-level similarity probability score for the pair of input sequences, the target region match indication for the pair of input sequences, the fuzzy match score for the pair of input sequences, the character-level match score for the pair of input sequences, one or more similarity ratio occurrence indicators for the pair of input sequences, and the harmonic mean score of the fuzzy match score for the pair of input sequences and the token-level similarity probability score for the pair of input sequences.

In some embodiments, the similarity score determination machine learning model may be a Cat-Boost machine learning model that is configured to generate a predicted similarity score for a pair of input sequences based at least in part on at least one of the token-level similarity probability score for the pair of input sequences, the target region match indication for the pair of input sequences, the fuzzy match score for the pair of input sequences, the character-level match score for the pair of input sequences, one or more similarity ratio occurrence indicators for the pair of input sequences, and the harmonic mean score of the fuzzy match score for the pair of input sequences and the token-level similarity probability score for the pair of input sequences.

In some embodiments, inputs to the similarity score determination machine learning model comprise vectors each corresponding to one of the token-level similarity probability score for the pair of input sequences, the target region match indication for the pair of input sequences, the fuzzy match score for the pair of input sequences, the character-level match score for the pair of input sequences, one or more similarity ratio occurrence indicators for the pair of input sequences, and the harmonic mean score of the fuzzy match score for the pair of input sequences and the token-level similarity probability score for the pair of input sequences. In some embodiments, outputs of the similarity score determination machine learning model comprise an atomic value or a vector describing the predicted similarity score for the pair of input sequences.

At step/operation 408, the predictive data analysis computing entity 106 performs one or more prediction-based actions based at least in part on the predicted similarity score. In some embodiments, the predictive data analysis computing entity 106 generates user interface data for a prediction output user interface that describes, for each pair of input sequences, whether the predicted similarity score for the pair describes a match. For example, as depicted in FIG. 6, the prediction output user interface 600 describes that the pair of input sequences 601 is associated with a match, while the pair of input sequences 602 is associated with a lack of a match. As another example, as depicted in FIG. 7, the prediction output user interface 700 describes that each pair of input sequences that is associated with the input sequence 701 and one of the input sequences 702-704 is associated with a similarity score that is indicated using the vertical segment 711.

Examples of prediction-based actions include performing database integration actions. In some embodiments, integrating two databases includes identifying records across the two databases that refer to the same subject matter, and consolidating the common subject matter records. For example, in some embodiments, two provider databases may be consolidated/integrated based at least in part on commonality of the provider addresses for the provider records contained in the two provider databases. In some of the noted embodiments, a predicted similarity score may be determined for two address input sequences for two provider records, and if the predicted similarity score for the two address input sequences satisfies a predicted similarity score threshold, the two provider records may be consolidated.

In one exemplary embodiment, given an input sequence $S_1$ for a record $R_1$ of database $D_1$ and an input sequence $S_2$ for a record $R_2$ of database $D_2$, if a predicted similarity score for $S_1$ and $S_2$ satisfies a predicted similarity score threshold, then $R_1$ and $R_2$ may be consolidated/integrated into a common record. As another example, given an input sequence $S_1$ for an incoming record $R_1$ for database $D_1$ and an input sequence $S_2$ for an existing record $R_2$ of $D_2$, if a predicted similarity score for $S_1$ and $S_2$ satisfies a predicted similarity score threshold, then $R_1$ may be consolidated/integrated into $R_2$.

As described above, various embodiments of the present invention introduce techniques for performing database integration/consolidation. By disclosing techniques for performing database integration/consolidation, various embodiments of the present invention introduce techniques that reduce the need for storage requirements for storing databases, as duplicate errors will be more storage-intensive than integrated/consolidated. Moreover, once integrated/consolidated, databases can be queried with greater efficiency and speed relative to unintegrated/non-consolidated databases. In this way, various embodiments of the present invention improve the efficiency of storing and querying databases, and make important technical contributions to the field of database systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors, a token-level similarity probability score for a pair of input sequences based at least in part on a first cross-token image representation for a first input sequence of the pair of input sequences and a second cross-token image representation for a second input sequence of the pair of input sequences, wherein the token-level similarity probability score is based at least in part on a comparison between a first dimensionally-reduced image representation for the first cross-token image representation and a second dimensionally-reduced image representation for the second cross-token image representation;
generating, by the one or more processors and a machine learning model, a predicted similarity score for the pair of input sequences based at least in part on the token-level similarity probability score; and
initiating, by the one or more processors, the performance of one or more prediction-based actions based at least in part on the predicted similarity score.

2. The computer-implemented method of claim 1, wherein the first cross-token image representation comprises a two-dimensional representation of a plurality of token-level embedded representations for the first input sequence and each token-level embedded representation for a particular token of the first input sequence is determined based at least in part on a Word2Vec representation of the particular token.

3. The computer-implemented method of claim 1, wherein generating the predicted similarity score for the pair of input sequences comprises:
determining a target region match indication for the pair of input sequences; and
generating the predicted similarity score based at least in part on the target region match indication and the token-level similarity probability score.

4. The computer-implemented method of claim 1, wherein generating the predicted similarity score for the pair of input sequences comprises:
determining a fuzzy match score for the pair of input sequences; and
generating the predicted similarity score based at least in part on the fuzzy match score and the token-level similarity probability score.

5. The computer-implemented method of claim 1, wherein generating the predicted similarity score for the pair of input sequences comprises:
determining a character-level match score for the pair of input sequences; and
generating the predicted similarity score based at least in part on the character-level match score and the token-level similarity probability score.

6. The computer-implemented method of claim 1, wherein generating the predicted similarity score for the pair of input sequences comprises:
determining a harmonic mean score of a fuzzy match score for the pair of input sequences and the token-level similarity probability score for the pair of input sequences; and
generating the predicted similarity score based at least in part on the harmonic mean score and the token-level similarity probability score.

7. The computer-implemented method of claim 1, wherein generating the predicted similarity score for the pair of input sequences comprises:
determining one or more similarity ratio occurrence indicators for the pair of input sequences; and
generating the predicted similarity score based at least in part on the one or more similarity ratio occurrence indicators and the token-level similarity probability score.

8. The computer-implemented method of claim 1, wherein the first cross-token image representation is based at least in part on a padded input sequence for the first input sequence, and the padded input sequence is generated based at least in part on a token count threshold.

9. A computing system for dynamically generating a predicted similarity score for a pair of input sequences, the computing system comprising one or more processors and memory including program code, the memory and the program code configured to, with the one or more processors, cause the computing system to at least:

generate a token-level similarity probability score for a pair of input sequences based at least in part on a first cross-token image representation for a first input sequence of the pair of input sequences and a second cross-token image representation for a second input sequence of the pair of input sequences, wherein the token-level similarity probability score is based at least in part on a comparison between a first dimensionally-reduced image representation for the first cross-token image representation and a second dimensionally-reduced image representation for the second cross-token image representation;

generate, using a machine learning model, a predicted similarity score for the pair of input sequences based at least in part on the token-level similarity probability score; and initiate the performance of one or more prediction-based actions based at least in part on the predicted similarity score.

10. The computing system of claim 9, wherein the first cross-token image representation comprises a two-dimensional representation of a plurality of token-level embedded representations for the first input sequence and each token-level embedded representation for a particular token of the first input sequence is determined based at least in part on a Word2Vec representation of the particular token.

11. The computing system of claim 9, wherein generating the predicted similarity score for the pair of input sequences comprises:

determining a target region match indication for the pair of input sequences; and generating the predicted similarity score based at least in part on the target region match indication and the token-level similarity probability score.

12. The computing system of claim 9, wherein generating the predicted similarity score for the pair of input sequences comprises:

determining a fuzzy match score for the pair of input sequences; and generating the predicted similarity score based at least in part on the fuzzy match score and the token-level similarity probability score.

13. The computing system of claim 9, wherein generating the predicted similarity score for the pair of input sequences comprises:

determining a character-level match score for the pair of input sequences; and generating the predicted similarity score based at least in part on the character-level match score and the token-level similarity probability score.

14. The computing system of claim 9, wherein generating the predicted similarity score for the pair of input sequences comprises:

determining a harmonic mean score of a fuzzy match score for the pair of input sequences and the token-level similarity probability score for the pair of input sequences; and generating the predicted similarity score based at least in part on the harmonic mean score and the token-level similarity probability score.

15. The computing system of claim 9, wherein generating the predicted similarity score for the pair of input sequences comprises:

determining one or more similarity ratio occurrence indicators for the pair of input sequences; and generating the predicted similarity score based at least in part on the one or more similarity ratio occurrence indicators and the token-level similarity probability score.

16. A computer program product comprising at least one non-transitory computer-readable storage medium having computer-readable program code portions stored therein, the computer-readable program code portions configured to:

generate a token-level similarity probability score for a pair of input sequences based at least in part on a first cross-token image representation for a first input sequence of the pair of input sequences and a second cross-token image representation for a second input sequence of the pair of input sequences, wherein the token-level similarity probability score is based at least in part on a comparison between a first dimensionally-reduced image representation for the first cross-token image representation and a second dimensionally-reduced image representation for the second cross-token image representation;

generate, using a machine learning model, a predicted similarity score for the pair of input sequences based at least in part on the token-level similarity probability score; and initiate the performance of one or more prediction-based actions based at least in part on the predicted similarity score.

* * * * *